(12) United States Patent
Lerenc

(10) Patent No.: US 9,506,768 B2
(45) Date of Patent: Nov. 29, 2016

(54) ADAPTIVE ROUTE PROPOSALS BASED ON PRIOR RIDES

(71) Applicant: SAP SE, Walldorf (DE)

(72) Inventor: Vedran Lerenc, Schoenau (DE)

(73) Assignee: SAP SE, Walldorf (DE)

( * ) Notice: Subject to any disclaimer, the term of this patent is extended or adjusted under 35 U.S.C. 154(b) by 125 days.

(21) Appl. No.: 13/780,778

(22) Filed: Feb. 28, 2013

(65) Prior Publication Data

US 2014/0244170 A1    Aug. 28, 2014

(51) Int. Cl.
  *G01C 21/00* (2006.01)
  *G01C 21/34* (2006.01)
  *G01C 21/36* (2006.01)

(52) U.S. Cl.
  CPC ......... *G01C 21/3484* (2013.01); *G01C 21/343* (2013.01); *G01C 21/3438* (2013.01); *G01C 21/362* (2013.01)

(58) Field of Classification Search
  CPC .............. G01C 21/34; G01C 21/3446; G01C 21/3484; G01C 21/3407; G01C 21/343; G01C 21/3438; G01C 21/3453; G01C 21/3605; G01C 21/362; G01G 1/0968; G01G 1/096805; G01G 1/096811; G01G 1/096816; G01G 1/096822; G01G 1/096827; G01G 1/096844; G01G 1/096855; G01G 1/096877; G01G 1/096883; G01G 1/096888
  USPC ....... 701/410, 411, 412, 418, 420, 424, 425, 701/426, 450, 467, 487, 521, 533, 538
  See application file for complete search history.

(56) References Cited

U.S. PATENT DOCUMENTS

| | | | | |
|---|---|---|---|---|
| 6,072,431 A | * | 6/2000 | Froeberg | G01S 19/37 342/357.31 |
| 6,751,548 B2 | * | 6/2004 | Fox | G01C 21/3461 701/400 |
| 7,002,489 B1 | * | 2/2006 | Denker | G08G 1/096716 340/539.13 |
| 7,809,502 B2 | * | 10/2010 | Iizuka | G01C 21/3679 340/990 |
| 8,433,513 B2 | * | 4/2013 | Goel | G01C 21/3476 701/450 |

(Continued)

*Primary Examiner* — Thomas G Black
*Assistant Examiner* — Sara Lewandroski
(74) *Attorney, Agent, or Firm* — Jones Day

(57) ABSTRACT

User input including a start location and an end location of a desired ride may be received. A database may be searched for completed routes matching the user input. The completed routes may include location information and travel time information associated with the completed routes. Upon identifying one or more matched completed routes, a route proposal for the desired ride may be generated based on the one or more matched completed routes.

24 Claims, 5 Drawing Sheets

(56) References Cited

U.S. PATENT DOCUMENTS

| | | | | |
|---|---|---|---|---|
| 8,504,295 B2* | 8/2013 | Lerenc | G01C 21/3438 | 701/527 |
| 8,825,407 B2* | 9/2014 | Brennan | G06Q 10/06 | 701/540 |
| 2001/0001848 A1* | 5/2001 | Oshizawa | G01C 21/3492 | 701/414 |
| 2004/0148095 A1* | 7/2004 | Katou | G01C 21/3484 | 701/410 |
| 2005/0049781 A1* | 3/2005 | Oesterling | G08G 1/202 | 701/468 |
| 2005/0055157 A1* | 3/2005 | Scholl | B60K 31/0008 | 701/410 |
| 2005/0192742 A1* | 9/2005 | Okochi | G01C 21/3484 | 701/424 |
| 2007/0276595 A1* | 11/2007 | Lewinson | G01C 21/3438 | 701/533 |
| 2008/0125958 A1* | 5/2008 | Boss | G06Q 10/047 | 701/123 |
| 2008/0255754 A1* | 10/2008 | Pinto | G01C 21/3691 | 701/119 |
| 2009/0174540 A1* | 7/2009 | Smith | B60Q 1/34 | 340/465 |
| 2011/0125794 A1* | 5/2011 | Hutschemaekers | G08G 1/202 | 707/776 |
| 2011/0145290 A1* | 6/2011 | Fujii | G01C 21/3484 | 707/780 |
| 2011/0184770 A1* | 7/2011 | Schwarzmann | G06Q 10/063 | 705/7.11 |
| 2012/0101716 A1* | 4/2012 | Kim | G01C 21/3461 | 701/408 |
| 2013/0024390 A1* | 1/2013 | Zlobinsky | G06Q 10/101 | 705/319 |
| 2013/0054134 A1* | 2/2013 | Wang | G01C 21/3484 | 701/424 |
| 2013/0113623 A1* | 5/2013 | Park | G01C 21/3438 | 340/539.13 |
| 2013/0179067 A1* | 7/2013 | Trowbridge | G01C 21/34 | 701/410 |
| 2013/0226365 A1* | 8/2013 | Brozovich | G06Q 50/30 | 701/1 |
| 2014/0156188 A1* | 6/2014 | Hart | G01C 21/3484 | 701/538 |
| 2014/0229101 A1* | 8/2014 | Glaser | G01C 21/34 | 701/487 |

* cited by examiner

ADAPTIVE ROUTE PROPOSALS BASED ON PRIOR RIDES

BACKGROUND INFORMATION

Existing navigation and map services plan routes based on raw map data such as street information including allowed/estimated average speeds. Although the map data is often carefully tuned, sometimes the route an experienced driver would take differs from a route proposed by a navigation system and/or the proposed route may require considerably less or more travel time. This is often an inconvenience to experienced drivers wishing to take an alternative route.

For example, this is can an inconvenience for carpool participants, where a driver may be continually matched with the same passengers for each ride and where the computed route is crucial for the pick-up and drop-off of each passenger. If the driver usually takes a different route or the route take more or less time, the navigation system time table and resulting calculations for pick-up and drop-off times may be skewed, which leads to an increased dissatisfaction for the passengers.

DETAILED DESCRIPTION

The subject matter will now be described in detail for specific preferred embodiments, it being understood that these embodiments are intended only as illustrative examples and are not to be limited thereto.

Embodiments may be discussed in systems to efficiently provide route proposals. In an embodiment, details associated with a completed vehicle route may be captured by an application. The details may include location information and travel time information associated with the completed route. The details associated with the completed route may be transmitted to a backend server. The backend server may store the details in a database and the details may be utilized to generate route proposals for future desired rides.

In an embodiment, the details may be captured by the application using location based services and automatically transmitted by the application to the backend server. In an embodiment, the details may be captured by the application from user input entered on a graphical user interface of the application.

In an embodiment, user input including a start location and an end location of a desired ride may be received. A database may be searched for completed routes matching the user input. The completed routes may include location information and travel time information associated with the completed routes. Upon identifying one or more matched completed routes, a route proposal for the desired ride may be generated based on the one or more matched completed routes.

In an embodiment, each matched completed route may include a start location and an end location within a predefined distance from the respective start location and the end location of the desired ride. In an embodiment, each matched completed route may include a first stopover location and a second stopover location within a predefined distance from the respective start location and the end location of the desired ride.

Figure 1:
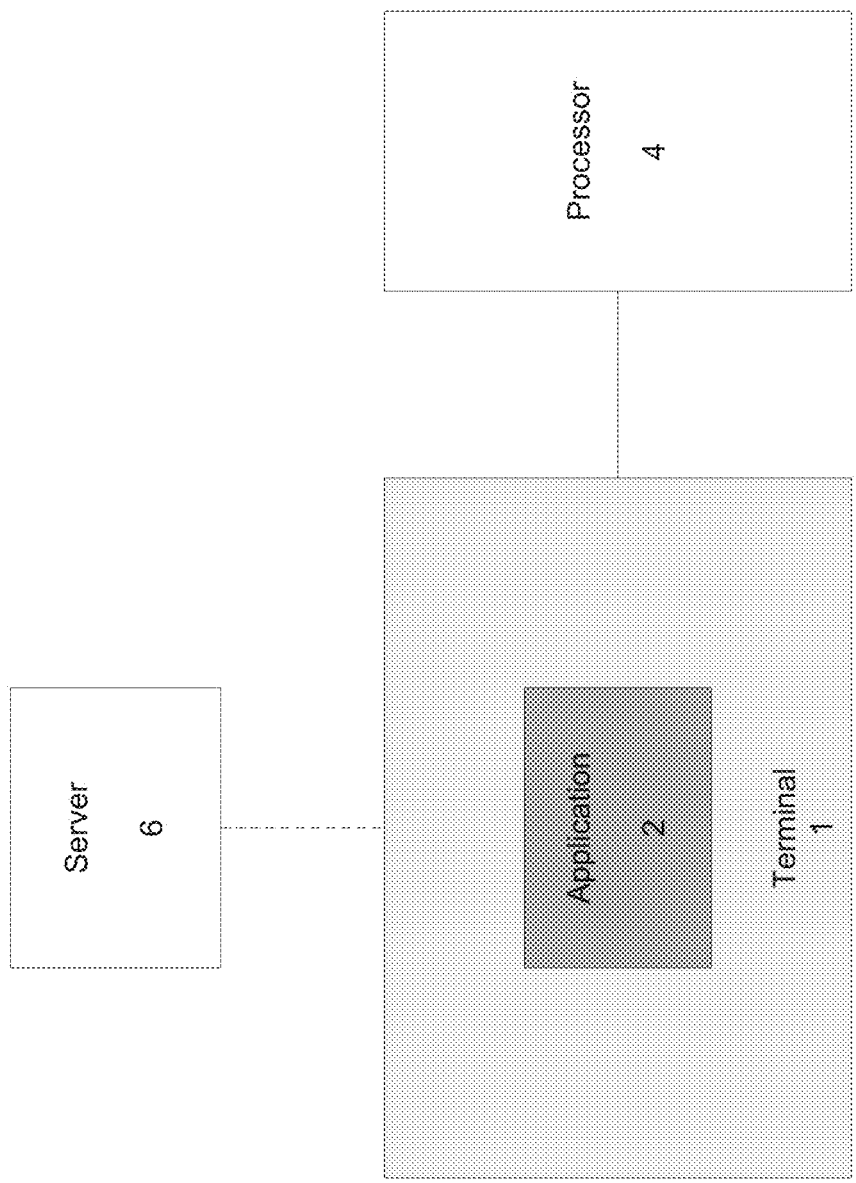
FIG. 1 is a diagram of an example embodiment of the system having a user terminal executing a web-based application on the terminal according to an embodiment.

FIG. 1 illustrates a diagram of a first example embodiment of the system having a user terminal 1 displaying a web-based application 2 on the terminal. Application 2 may be executed, for example, by a processor 4 and may be displayed on user terminal 1 to a user. The web-based application 2 displayed on the user terminal 1 may connect to server 6 as illustrated in FIG. 1. User terminal 1, may be embodied, for example, as a desktop, laptop, hand-held device, personal digital assistant (PDA), television set-top Internet appliance, mobile telephone, smart phone, iPod™, iPhone™, iPad™, etc., or as a combination of one or more thereof, or other comparable device having Internet access to display the web-based application 2.

In an example embodiment, application 2 may be a web-based application that is implemented on a back end component and displayed on a user interface on user terminal 1. In another embodiment, the application may be a computer-based application stored locally and displayed on terminal 1.

In an example embodiment, the system and method may include one or more processors 4, which may be implemented using any conventional processing circuit and device or combination thereof, e.g., a central processing unit (CPU) of a personal computer (PC) or other workstation processor, to execute code provided, e.g., on a hardware computer-readable storage medium including any conventional memory device, to perform any of the methods described herein, alone or in combination. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), Blu-ray Disk™, and magnetic tape.

The system may include server 6 which may interact with user terminal 1. Server 6 may be implemented locally or remotely using processing circuits or devices or combinations thereof, such as, for example, a central processing unit (CPU) of a personal computer (PC) or other workstation processor, such as processor 4. User terminal 1 may connect to server 6 through a computer network or a wireless network such as a cellular network, WLAN network, short range communication network (i.e. BLUETOOTH®) or a combination of different wired and/or wireless networks. Server 6 may include one or more databases to collect and store generated user profiles and preferences for each of the users of the complex system.

In an example embodiment, web-based application 2 may display a map to a driver, or other user, who access the application 2 on user terminal 1 after the completion of a route. In this example embodiment, the map displayed to the driver may display all stopover locations along the completed route. This may include all scheduled pick-up and/or drop-off locations of passengers and other stopover locations for the vehicle. In an embodiment, the user may also add additional stopover locations on the map display of the completed route.

In an example embodiment, the user may supply time information into the web-based application 2. This time information may include, for example, the actual time the route started, the time the route ended, the arrival time at each stopover location, the departure time at each stopover location, and other time inputs such as, for example, the time the vehicle passes a particular landmark or intersection. In another embodiment, the user may input an absolute time span for each individual ride segments between each stopover location.

The route and time information input by the user may be stored in a database on server 6. During a generated route proposal by application 2 between the same two locations, server 6 may retrieve the stored information from the database. The database may be scanned for start and end destinations corresponding to the identical inputted start and end destinations by the user. Upon determining a match, this stored information may be retrieved from the database. Server 6 may generate a route proposal based on the retrieved route information and transmit the route proposal for display in application 2 and/or another application displayed on another device such as a vehicle-integrated navigation device (not shown).

Figure 2:
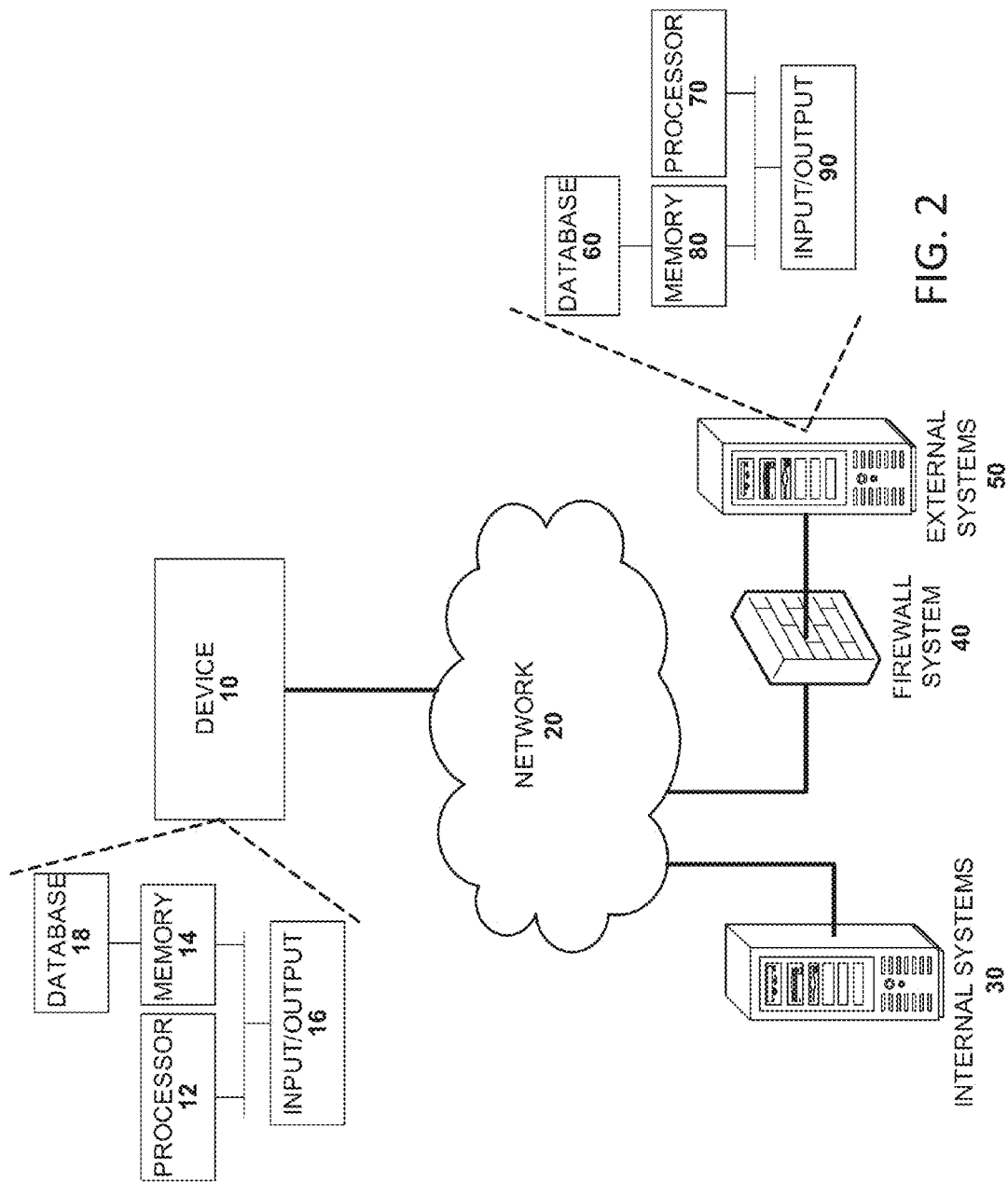
FIG. 2 is a diagram of an example embodiment of the system having a mobile device executing a mobile application according to an embodiment.

FIG. 2 illustrates a diagram of a second example embodiment of the system having a mobile application incorporated on a mobile device 10. In an embodiment, device 10 may be a hand-held device, personal digital assistant (PDA), television set-top Internet appliance, mobile telephone, smart phone, tablet, Android™ device, iPod™, iPhone™, iPad™, Windows™ based device, etc., or as a combination of one or more thereof, or other comparable device. A mobile application, such as, for example, a trip sharing service or other type of application, may be executed on device 10. This mobile application may be displayed in a user interface that is displayed on a screen of the device 10.

The mobile application may be used to determine a location and speed of the traveling vehicle, since the mobile device 10 may be present in the vehicle. Determining a location of the device 10 may be made by connecting the device 10 to backend computer systems or networks to identify the geographic location of the device 10 at specific time intervals or points. In an example embodiment, these specific time points may correspond to the start location, the end location, stopover locations along the route (including drop-off and pick-up locations of the passengers), and at certain points in which the device 10 (and vehicle) pass specific landmarks, points of interest, and intersections. Identification of the location of the device may be made through location based services using GPS technology, where, for example, device 10 may connect directly to a satellite, with the geographic position and other location data being transmitted back to device 10 which transmits this data to the backend system, or alternately, the backend system itself may connect to a satellite. Upon identification of a location of device 10, this location may be stored in a memory 80 along with corresponding timestamp information. This time information may provide information as to what time device 10 was at the particular location point, i.e. stopover location, or start/end locations.

Determined locations and their corresponding timestamps of device 10 along a route may be stored in one or more databases in the backend system. When the data is retrieved, the location and time data may be translated to a data protocol by a gateway that may be part of a firewall system 40. Device 10 may connect to a gateway through a platform that provides a secured connection for connectivity.

The backend systems storing possible location data may be separated into internal backend systems and external backend systems. Device 10 may connect to internal backend systems 30 through a network 20. Device 10 may also connect to external backend systems 50 through the network 20 and a firewall system 40. In an embodiment, network 20 may be implemented as a cellular network, WLAN network, short range communication network (i.e. BLUETOOTH®) or a combination of different wired and/or wireless networks. The firewall system 40 may include a gateway and a platform to translate the location data to a data protocol and provide a secured connection.

The internal backend systems 30 may include a server and may provide location based data including the geographic location data, which may correspond to the designated stopover points, and associated timestamp information. The external backend systems 50 may include a server, and may also include location based data tracking the location of device 10. The application on device 10 may interact with these external systems to obtain updates on the location of device 10, through a firewall system 40 separating the internal systems from the external systems. The gateway and platform provided by the firewall system 40 may allow for a secure transmission of the GPS location data to/from device 10.

Device 10 may include a processor 12, a memory 14, and input/output interface 16, and a database 18. Database 18 may include any type of data storage adapted to searching and retrieval. In an example embodiment, determined location data may be stored directly on device 10 in database 18 or memory 14, which may have a designated storage capacity. When the mobile application accesses the locally saved location data, processer 12 may retrieve the data from memory 14. In an embodiment, memory 14 may include different components for retrieving, presenting, changing, and saving the local data. Memory 14 may include a variety of memory devices, for example, Dynamic Random Access Memory (DRAM), Static RAM (SRAM), flash memory, cache memory, and other memory devices. In an embodiment, memory 14 may be a memory device that may be easily incorporated in a mobile device.

The backend systems 30 and 50 may both include a processor 70, memory 80, a database 60, and an input/output interface 90, all of which may be interconnected via a system bus. In various embodiments, both of the systems 30 and 50 may have an architecture with modular hardware or software systems that include additional systems communicating through one or more networks. The modular design may enable a business to add, exchange, and upgrade systems, including using systems from different vendors in some embodiments.

In an embodiment, memory 80 may include different components for retrieving, presenting, changing, and saving the location data. Memory 80 may include a variety of memory devices, for example, Dynamic Random Access Memory (DRAM), Static RAM (SRAM), flash memory, cache memory, and other memory devices. Additionally, for example, memory 80 and processor 70 may be distributed across several different computers that collectively comprise a system.

Database 60 may include any type of data storage adapted to searching and retrieval. The databases of internal backend systems 30 and external backend system 50 may store location data for retrieval by the application executed on device 10.

Processor 70 may perform computation and control functions of a system and comprises a suitable central processing unit. Processor 70 may comprise a single integrated circuit, such as a microprocessor, or may comprise any suitable number of integrated circuit devices or circuit boards working in cooperation to accomplish the functions of a processor. Processor 70 may execute computer programs, such as object-oriented computer programs, within memory 80.

In an example embodiment, the mobile application may be configured to provide location data of the device 10 only at designated stopover points on the route. In another example embodiment, device 10 may include accelerometers integrated into the device to provide the speed at which device 10 is traveling. This may be used to provide a speed of the vehicle, which may also be logged and stored in database 60.

The route location, timestamp information, and speed information ascertained by device 10 may be stored in database 60. In an embodiment, the device 10 may directly transmit the route/timestamp information to the database 60. In another embodiment, device 10 may transmit the route/timestamp information to a navigation system, for example, integrated into the vehicle itself. Transmission may occur manually on user request or automatically pushed by the application. The navigation system may then transmit the route/timestamp information to the database 60. Database 60 may include a log and/or time table of the determined location points and their corresponding timestamps, which may be used for future route proposals generated for the same start and end locations. During a generated route proposal by the navigation system between the same two locations, backend system 50 may retrieve the stored information from the database 60. The database 60 may be scanned for start and end destinations corresponding to the identical inputted start and end destinations by the user. Upon determining a match, this stored information may be retrieved from the database 60.

Backend system 50 may transmit the stored route information and/or the proposed route to the navigation system. In another embodiment, the backend system 50 may transmit the stored route information and/or the proposed route to device 10 when called on by the application integrated into device 10. Device 10 may further transmit this information the navigation system. Transmission may occur manually on user request or automatically pushed by the application. The navigation system may generate a route proposal based on the retrieved route information and transmit the route proposal for display. In an alternate embodiment, the route proposal may be displayed directly in the user interface of device 10.

Figure 3:
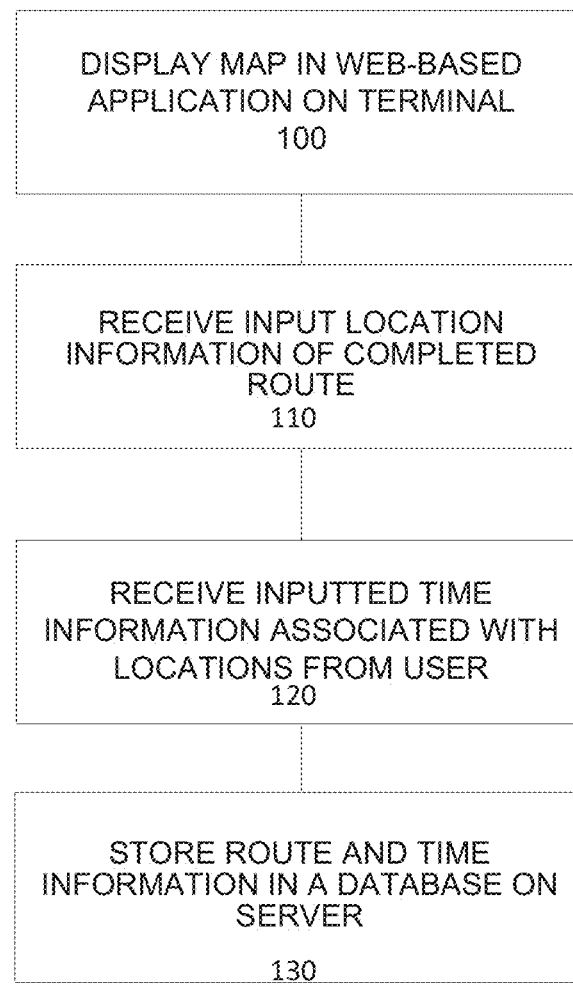
FIG. 3 is a diagram of the process of receiving completed route information according to an embodiment.

FIG. 3 illustrates a diagram of the process of receiving completed route information in an implementation using a web-based application displayed on a user interface of user terminal 1. In step 100, a map may be displayed in application 2 displayed on the user interface of user terminal 1. The map may display particular stopover locations along the completed route. This may include all scheduled pick-up or drop-off locations of passengers and other predesignated stopover locations for the vehicle.

In step 110, the system may receive user input location information along the completed route and/or directions utilized during the completed route. In an embodiment, the user may input specific location information along the completed route. The location information may include street intersections, landmarks, and building addresses along the completed route. In an embodiment, the user may input the directions utilized to drive along the completed route. This location information and/or directions may be utilized by a backend system to determine the completed route. In an embodiment, the user may drag a cursor and/or draw on the map, via the user interface, to indicate the completed route.

In step 120, the system may receive time information input by the user into the web-based application 2. This received time information may include, for example, the actual time the route started at the start location, the time the route ended at the terminal destination, the arrival time at each stopover location, the departure time at each stopover location, and various other time inputs that the user deems important, including, for example, the time the vehicle passes a particular landmark, point of interest, or intersection. The user may also input an absolute time span for each individual ride segments between each stopover location into application 2. In step 130, the route and time information input by the user may be stored in a database on the backend server.

Figure 4:
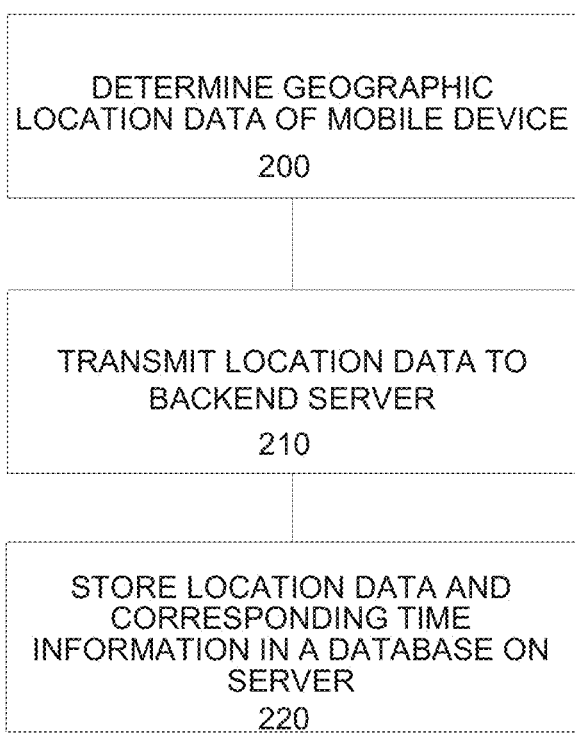
FIG. 4 is a diagram of the process of receiving completed route information according to an embodiment.

FIG. 4 illustrates a diagram of the process of receiving completed route information in an implementation using a mobile application integrated on a mobile device 10. In step 200, the geographic location of mobile device 10 may be determined. The location may be determined, in particular, through the use of location based services such as GPS or known WiFi hotspots in the vicinity. In an embodiment, these location based services may be integrated directly into device 10. These location based services may track the geographic location used to fingerprint the movement of device 10.

In step 210, the acquired location data may be transmitted back from the device to a backend server. In an embodiment where the backend server may connect directly with a satellite, a determined geographic location may be transmitted directly to the backend server. In an embodiment, the geographic location data may be timestamped, which may provide information as to what exact point in time the device 10 was at a given location. In an example embodiment, the location data may include information about the location of designated stopover points, as well as the start and end points of a trip, various landmarks, points of interest, and intersections. The timestamped information accompanying the location data may include information such as, for example, the actual time the route started at the start location, the time the route ended at the terminal destination, the arrival time at each stopover location, the departure time at each stopover location, and various other time inputs that the user deems important, including, for example, the time the vehicle passes a particular landmark, point of interest, or intersection. In step 220, the timestamped determined geographic location(s) may be stored in database 60 and/or memory 80 of the backend system.

Figure 5:
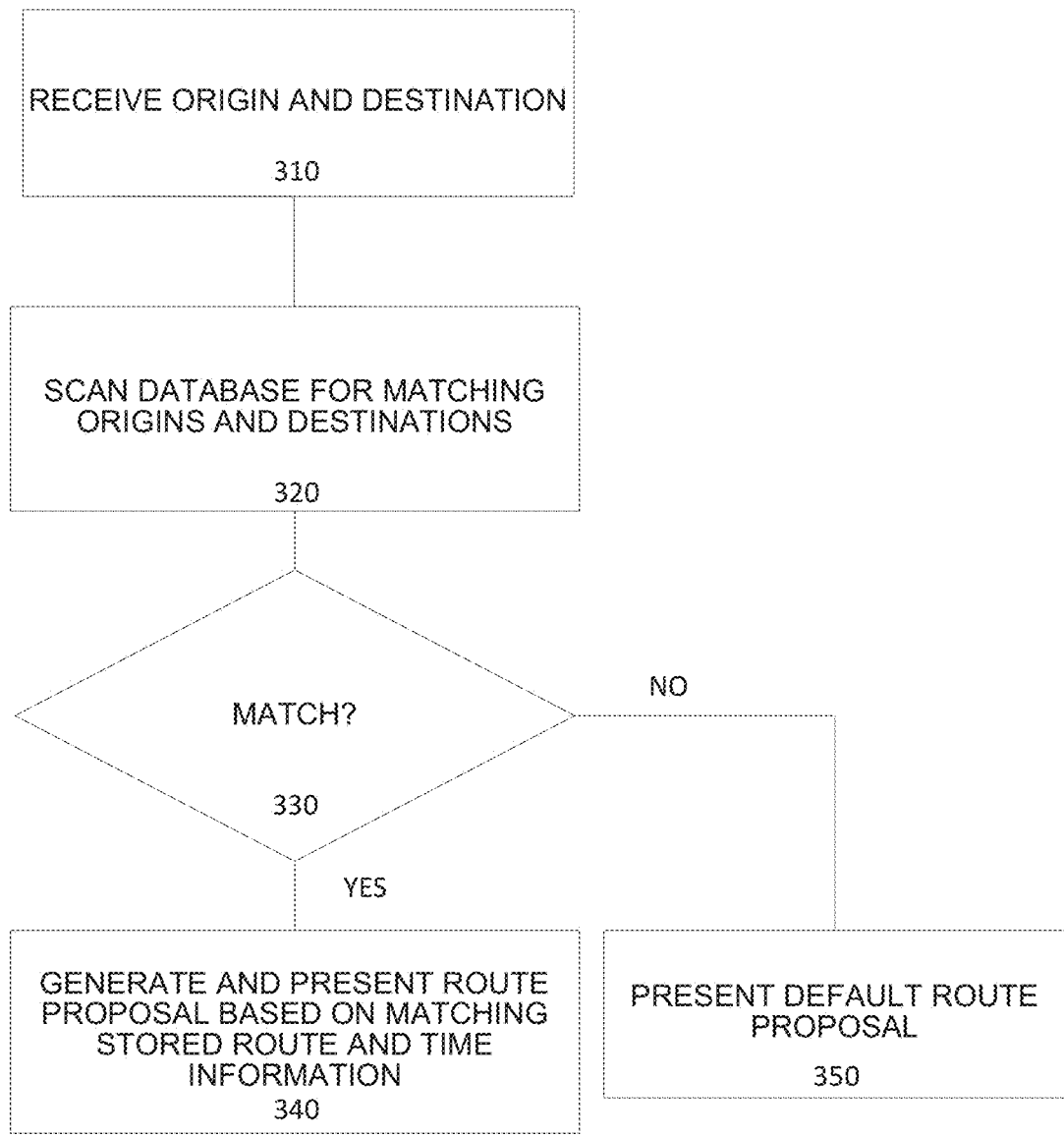
FIG. 5 illustrates a diagram of a process for generating optimized route proposals according to an embodiment.

FIG. 5 illustrates a diagram of a process for presenting optimized route proposals according to an embodiment. In an embodiment, the completed route information stored in the database as described in reference to FIG. 3 and FIG. 4 may be utilized for generating route proposals for future desired rides. In step 310, a user may enter an origin and a destination of a desired ride into a device. The device may be a navigation device integrated into the vehicle, a mobile device, and/or any other device which may provide the user with driving directions. In response, a search may be conducted in the database to find stored routes with the same origin and destination 320. If a matching stored route is found 330, proposed directions and/or proposed route information may be generated from the matching stored route and presented to the user via the navigation device and/or mobile device 340. The proposed route information may include estimated driving times and/or suggested stopover locations.

Otherwise, a default route proposal may be presented to the user via the navigation device and/or mobile device 350.

In an embodiment, a match may be determined at step 330 within a tolerance level. Specifically, a stored route may be deemed to match the input origin and destination if the origin and destination of the stored route are within a predefined distance (tolerance level) from the respective input origin and destination.

In an embodiment, at step 310, the user may input stopover locations in addition to the origin and destination. In this embodiment, a stored route in the database may be deemed to match the input if the stored route includes, within a tolerance level, the same origin, destination, and stopover locations.

In certain cases, multiple matches may be identified at step 330. In an embodiment, if multiple matches are identified, a further search may be conducted within the multiple matches to determine the most appropriate match, and the most appropriate match may be utilized to generate the route proposal in 340. In an embodiment, the most appropriate match may be the match with a route that is stored most frequently in the database. In another embodiment, the most appropriate match may be the match which was most recently stored in the database.

In an embodiment, at step 330, a match may be identified if the input origin and destination are, within a tolerance level, the same as stopover locations of a stored route. For example, a user may input origin B and destination C at step 310. The database may include a stored route X with origin A, stopover location B, stopover location C, and destination D. Since the input origin B matches stored stopover location B and input destination C matches stored stopover location C, stored route X may be deemed as a match at step 330.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the spirit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A computer-implemented method comprising:
   capturing, by an application, details associated with a completed vehicle route, wherein the details include location information and travel time information associated with the completed route; and
   transmitting the details associated with the completed route to a backend server, wherein the backend server stores the details in a database, and wherein the application:
   (i) retrieves, from the database, matches having stored details that were compared to at least one of an origin and a destination entered into the application as part of a future desired ride,
   (ii) searches the retrieved matches to determine an appropriate match according to a route that was most recently stored in the database, and
   (iii) proposes, via one of a mobile device and a navigation device, at least one route including a route corresponding to the appropriate match;
   wherein the application is hosted on a device, and wherein the backend server is connected to the device over a network, the backend server further comprising:
   an internal backend system that receives the transmitted details associated with the completed route, and
   an external backend system that provides, through a firewall, the location information to the device for the capturing.

2. The method of claim 1, wherein the details are captured by the application using location based services and automatically transmitted by the application to the backend server.

3. The method of claim 1, wherein the details are captured by the application from user input entered on a graphical user interface of the application.

4. The method of claim 1, wherein the application further searches the retrieved matches to determine the appropriate match according to a route stored most frequently by the backend server.

5. The method of claim 1, wherein the proposed route corresponding to the appropriate match includes suggested stopover locations.

6. A computer-implemented method comprising:
   capturing through an application, an origin and a destination to be used in a future desired ride;
   transmitting the origin and the destination to be used in the future desired ride to a backend server;
   receiving, from the backend server, stored routes that have the an origin and a destination that match the transmitted origin and the destination;
   searching the received stored routes to determine an appropriate match according to a route that was most recently stored in the database, and
   proposing at least one route including a route corresponding to the appropriate match via a device that is communicatively coupled to the processor including one of a mobile device and a navigation device;

wherein the application is hosted on a device, and wherein the backend server is connected to the device over a network, the backend server further comprising:
an internal backend system that receives the transmitted details associated with the completed route, and
an external backend system that provides, through a firewall, the location information to the device for the capturing.

7. An apparatus comprising:
a processor configured to:
capture, through an application, details associated with a completed vehicle route, wherein the details include location information and travel time information associated with the completed route; and
transmit the details associated with the completed route to a backend server, wherein the backend server stores the details in a database, and wherein the application:
(i) retrieves, from the database, matches having stored details that were compared to at least one of an origin and a destination entered into the application as part of a future desired ride,
(ii) searches the retrieved matches to determine an appropriate match according to a route that was most recently stored in the database, and
(iii) proposes, via one of a mobile device and a navigation device, at least one route including a route corresponding to the appropriate match;
wherein the application is hosted on a device, and wherein the backend server is connected to the device over a network, the backend server further comprising:
an internal backend system that receives the transmitted details associated with the completed route, and
an external backend system that provides, through a firewall, the location information to the device for the capturing.

8. The apparatus of claim 7, wherein the details are captured by the application using location based services and automatically transmitted by the application to the backend server.

9. The apparatus of claim 7, wherein the details are captured by the application from user input entered on a graphical user interface of the application.

10. The apparatus of claim 7, wherein the processor is further configured to capture at least one of: a speed of the traveling vehicle; a geographic location of the traveling vehicle; a time of departure from an origin; a time of arrival at the destination; at least one stopover location along the route; a time of arrival at each stopover location along the route; an absolute time span between departure from the origin and arrival and the destination; and intersections through which the vehicle travels.

11. The apparatus of claim 7, wherein the details associated with the completed vehicle route are made available to a user over a graphical user interface of the application to adjust the details to include one of: more accurate details and additional details.

12. A computer-implemented method for execution by at least one data processor forming part of at least one computing device, the method comprising:
receiving, by at least one data processor, user input including a start location and an end location of a desired ride;
searching, by at least one data processor, a database for completed routes matching the user input, wherein the completed routes include location information and travel time information associated with the completed routes;
identifying, by at least one data processor, whether the database contains completed routes matching the user input;
upon identifying at least one matched completed route:
searching, by at least one data processor, the at least one matched completed route to determine an appropriate match according to a route that was most recently stored in the database,
generating, by at least one data processor, a route proposal for the desired ride based on the at least one matched completed route and the appropriate match, and presenting the route proposal to the user; and
upon not identifying at least one matched completed route:
presenting, by at least one data processor, a default route proposal to the user,
wherein each matched completed route includes a start location and an end location within a predefined distance from the respective start location and the end location of the desired ride,
wherein each matched completed route includes a first stopover location and a second stopover location within a predefined distance from the respective start location and the end location of the desired ride, and
wherein one of the route proposal and the default route proposal is presented to the user via one of a mobile device and a navigation device.

13. A non-transitory computer-readable medium embodied with computer-executable instructions for causing a computer to execute instructions, the computer instructions comprising:
capturing, by an application being executed by at least one data processor forming part of at least one computing device, details associated with a completed vehicle route, wherein the details include location information and travel time information associated with the completed route; and
transmitting the details associated with the completed route to a backend server, wherein the backend server stores the details in a database, and wherein the application:
(i) retrieves, from the database, matches having stored details that were compared to at least one of an origin and a destination entered into the application as part of a future desired ride,
(ii) searches the retrieved matches to determine an appropriate match according to a route that was most recently stored in the database, and
(iii) proposes, via one a mobile device and a navigation device, at least one route including a route corresponding to the appropriate match;
wherein the application is hosted on a device, and wherein the backend server is connected to the device over a network, the backend server further comprising:
an internal backend system that receives the transmitted details associated with the completed route, and
an external backend system that provides, through a firewall, the location information to the device for the capturing.

14. The medium of claim 13, wherein the details are captured by the application using location based services and automatically transmitted by the application to the backend server.

15. The medium of claim 13, wherein the details are captured by the application from user input entered on a graphical user interface of the application.

16. A non-transitory computer-readable medium embodied with computer-executable instructions for causing a computer to execute instructions, the computer instructions comprising:
    receiving user input including a start location and an end location of a desired ride;
    searching a database for completed routes matching the user input, wherein the completed routes include location information and travel time information associated with the completed routes;
    identifying whether the database contains completed routes matching the user input;
    upon identifying at least one matched completed route:
        searching the at least one matched completed route to determine an appropriate match according to a route that was most recently stored in the database,
        generating a route proposal for the desired ride based on the at least one matched completed route and the appropriate match, and presenting the route proposal to the user; and
    upon not identifying at least one matched completed route:
        presenting a default route proposal to the user,
    wherein one of the route proposal and the default route proposal is presented to the user via one of a mobile device and a navigation device;
    wherein each matched completed route includes a first stopover location and a second stopover location within a predefined distance from the respective start location and the end location of the desired ride.

17. The medium of claim 16, wherein each matched completed route includes a start location and an end location within a predefined distance from the respective start location and the end location of the desired ride.

18. An apparatus comprising:
    a processor configured to:
        receive user input including a start location and an end location of a desired ride;
        search a database for completed routes matching the user input, wherein the completed routes include location information and travel time information associated with the completed routes;
        identify whether the database contains completed routes matching the user input; and
    upon identifying at least one matched completed route:
        search the at least one matched completed route to determine an appropriate match according to a route that was most recently stored in the database,
        generate a route proposal for the desired ride based on the at least one matched completed route and the appropriate match, and present the route proposal to the user; and
    upon not identifying at least one matched completed route:
        present a default route proposal to the user,
    wherein one of the route proposal and the default route proposal is presented to the user via one of a mobile device and a navigation device;
    wherein each matched completed route includes a first stopover location and a second stopover location within a predefined distance from the respective start location and the end location of the desired ride.

19. The apparatus of claim 18, wherein each matched completed route includes a start location and an end location within a predefined distance from the respective start location and the end location of the desired ride.

20. An apparatus comprising:
    a processor configured to:
        capture, through an application, an origin and a destination to be used in a future desired ride;
        transmit the origin and the destination to be used in the future desired ride to a backend server;
        receive, from the backend server, stored routes that have the origin and a destination that match the transmitted origin and the destination;
        search the retrieved matches to determine an appropriate match according to a route that was most recently stored in the database; and
        propose at least one route including a route corresponding to the appropriate match via a device that is communicatively coupled to the processor including one of a mobile device and a navigation device;
    wherein the application is hosted on a device, and wherein the backend server is connected to the device over a network, the backend server further comprising:
        an internal backend system that receives the transmitted details associated with the completed route, and
        an external backend system that provides, through a firewall, the location information to the device for the capturing.

21. The apparatus of claim 20, having the processor further configured to:
    capture, through the application, additional information to be used in the future desired ride.

22. The apparatus of claim 20, wherein the received stored routes are further searched to determine the appropriate match according to an origin of a match and a destination of the match are within a tolerance level of the origin and the destination transmitted to the backend server.

23. A computer-implemented method for implementation by one or more data processors forming part of at least one computing device, the method comprising:
    receiving, by at least one data processor, user input including a start location and an end location of a desired ride;
    searching, by at least one data processor, a database for completed routes matching the user input, wherein the completed routes include location information and travel time information associated with the completed routes;
    identifying, by at least one data processor, whether the database contains completed routes matching the user input; upon identifying at least one matched completed route;
    searching, by at least one data processor, the at least one matched completed route to determine an appropriate match according to a route that was most recently stored in the database,
    generating, by at least one data processor, a route proposal for the desired ride based on the at least one matched completed route and the appropriate match, and presenting the route proposal to the user; and
    upon not identifying at least one matched completed route:
        presenting, by at least one data processor, a default route proposal to the user,
    wherein one of the route proposal and the default route proposal is presented to the user via one of a mobile device and a navigation device;
    wherein each matched completed route includes a first stopover location and a second stopover location within a predefined distance from the respective start location and the end location of the desired ride.

24. The method of claim 23, wherein each matched completed route includes a start location and an end location within a predefined distance from the respective start location and the end location of the desired ride.

* * * * *